United States Patent Office 3,184,370
Patented May 18, 1965

3,184,370
CERAMIC PROCESS AND PRODUCT
Daniel W. Luks, Frenchtown, N.J., assignor to Frenchtown Porcelain Company, Trenton, N.J., a corporation of New Jersey
No Drawing. Filed Nov. 23, 1959, Ser. No. 854,597
10 Claims. (Cl. 161—193)

This application relates to a method for making ceramic bodies and in particular ceramic bodies of large dimensions, or of intricate shapes.

The use of ceramics in various applications where resistance to high temperature, erosion and corrosion is required has grown greatly in recent years. However, difficulties are encountered in making large structural shapes to exact measurements. Thus, if a large ceramic body is molded or otherwise formed in conventional fashion and fired to its maturing temperature there will be a tendency for the body to sag and deform under its own weight during firing. This has proved to be an obstacle to the accurate formation of large ceramic bodies.

Moreover many bodies, even in small sizes, cannot be molded in a single piece because of the intricacy of their shapes.

For many years it has been known to join two ceramic bodies by painting a glass or flux on their surfaces and then firing at a temperature sufficient to make the flux flow. Such bonds are comparatively weak, however, and in general will not approach the physical strength of the bodies themselves.

The present invention provides a method for making ceramic bodies which enables large, high strength bodies to be made with great accuracy, while avoiding deformation during firing. It is also useful for making smaller bodies having intricate shapes.

Specifically the invention provides a method for making ceramic bodies which comprises pre-firing a plurality of basic ceramic sections of a size sufficiently small to avoid deformation during firing, interposing between said basic sections a fired ceramic bonding section having a glass phase miscible with the glass phase of the basic sections but having a lower maturing temperature than the glass phase of the basic sections, and firing the assembly at a temperature which is at least equal to the maturing temperature of the bonding section but below that at which objectionable deformation of the basic sections occurs.

The ceramics which can be used in the present process vary widely, and their chemical composition is not a part of the invention. Of course, both the basic sections and the bonding sections must have a glass phase and a crystalline phase. Again, the basic and bonding sections should preferably be physically similar in respect to fundamental properties such as coefficient of thermal expansion. The degree of similarity required and the characteristics in which high degree of similarity is required will depend on the use to which the finished article is to be put. For example, with bodies designed for electrical purposes it may be desirable that properties such as the dielectric constant and loss factor be similar. For most purposes the difference in coefficient of thermal expansion should be not more than say $\pm .5 \times 10^{-6}$.

As pointed out above, the glass phases of the bonding and basic sections should be miscible with one another. This is necessary because upon firing, the glass from the bonding section must be capable of flowing into the basic sections to an appreciable extent, e.g. on the order of at least 0.03 inch, so that ultimately a continuous glass phase will be formed between the basic and bonding sections.

The bonding section must have a lower maturing temperature than the basic sections. In theory there is no reason why a very slight difference in maturing temperature should not be sufficient to carry out the invention. Theoretically, the difference need only be great enough so that the assembled article can be fired at some temperature which will insure softening and flow of the glass phase in the bonding section, but which will not cause such softening in the sections to be bonded. As a practical matter, the difference in maturing temperatures should be on the order of at least 50° C.

There is no upper limit on difference in maturing temperature. However, when the difference is greater than say 100° C., the physical properties of the two are normally sufficiently different so that the composite article is not desirable for most purposes.

The physical size of the bonded and bonding sections is open to wide variation, and may be somewhat different for each physical shape and each type of ceramic. In general, since the ultimate goal is usually to make the composite body as nearly as possible like a body made wholly out of the material used for the basic sections, these sections will be made as large as possible without deformation. As will readily be appreciated the maximum size will depend on the configuration of the body, the chemical composition of the ceramic and the degree of deformation that can be tolerated.

The bonding section is normally made as small as possible and will usually be at least an order of magnitude smaller than the basic sections.

The bonding section will necessarily deform to a greater or less extent during firing. Therefore, the smaller it is, the less effect its deformation will have on the shape of the composite body. Moreover, it has been found that the thinner the bonding section, the greater the bond strength. So far as applicant has discovered the minimum thickness of the bonding section is dependent on the physical limitations in making and handling very thin ceramic sheets or wafers. This will vary with the other dimensions of the bonding sections as well as with the ceramic composition. Thus if the ceramic article to be made is large, such for example, as a cylindrical shell 18" in diameter with walls 2 inches thick, very thin bonding sections cannot conveniently be handled. On the other hand, with smaller objects, for example ½" diameter rods, bonding sections 0.015" thick have been used successfully and there is no reason why smaller sheets or wafers could not be used under suitable circumstances.

In certain instances the bonding section may be cut across its width to form two or more sub-sections for ease of handling. For example, the ring shaped bonding section referred to above for use in building a cylindrical shell might be divided into two or more arc shaped sub-sections. In this way thinner bonding sections may be employed. Care must be taken, however, that the several sub-sections fit together to avoid forming apertures in the finished article.

The physical manipulation required to carry out the present process is extremely simple. However, the dimensional accuracy of the product will depend on the care with which it is carried out.

On a drawing or model of the body desired, the basic bonding sections may first be marked off. These sections are then made by conventional techniques, for example by making up a raw batch of the desired chemical composition, molding it to the shape desired and firing at a temperature selected to develop the desired ceramic structure. Some experimentation may be necessary to determine just how large the basic sections can be made without deformation although experienced ceramists accustomed to working with the particular composition being employed will generally be able to estimate accurately.

Following the same procedure, the bonding sections are made, the composition of the raw mix being selected to give a lower maturing temperature than that of the basic sections, and the physical size of the sections being as small as practical considering the shape and composition.

The faces of the bonding sections and basic sections are preferably next ground to a smooth finish to insure a close fit and to eliminate pockets between the sections after firing, which would weaken the final product. A suitable allowance for this grinding may be made in the initial formation of the article. The bonding and basic sections are then assembled into the desired shape, a bonding section being interposed between each pair of the basic sections.

If desired, pressure may be exerted on the assembly to prevent slippage during firing and to promote coalescence of the bonding and basic sections during firing. The assembly is fired at a temperature at least equal to the temperatures at which the bonding sections were fired and below the temperature at which the bonding sections would undergo objectionable deformation. Normally the temperature is below the maturing temperature of the basic sections and usually at least 20° C. below that maturing temperature. The firing time is sufficient to permit flow of glass from the bonding section into the border of the adjacent section to be bonded and inter-crystalline growth to occur in the border area between sections. The rate of firing is normally from say 5° C./hr. to 20° C./hr. Normally the "soaking" period at peak temperature is on the order of 60 to 180 minutes. The bodies are then allowed to cool slowly, say at 5° C. to 60° C./hr. according to the composition of the ceramic, and removed from the kiln.

The invention will be further described with reference to the following specific examples which are cited as illustrations of the invention and should not be taken as in any way restricting the invention beyond the scope of the appended claims.

In certain of the examples the compositions described are in the system $Al_2O_3$-$SiO_2$-MnO, in which the weight proportion of $Al_2O_3$ is at least about 50%. These compositions are described and claimed in United States Patent 2,290,107 of the present inventor and have been found admirably suited for carrying out the present invention. In this system, for any basic section suitable bonding sections can be obtained by increasing the proportions of MnO or silica or both at the expense of the alumina.

EXAMPLE I

Two pre-fired rods 5/8″ diameter by 2¾″ long of a high alumina ceramic having the following composition (percent by weight):

| | |
|---|---|
| $Al_2O_3$ | 94.5 |
| $SiO_2$ | 2.8 |
| MnO | 2.7 |
| | 100.0 | were joined by means of a bonding section 5/8″ diameter 1/16″ thick having the following composition (percent by weight):

| | |
|---|---|
| $Al_2O_3$ | 90.0 |
| $SiO_2$ | 3.5 |
| MnO | 6.5 |
| | 100.0 |

The rods had been fired at 1465° C. (cone 17). The bonding section prior to being assembled had been fired at 1390° C. (cone 14). The crystalline phases of both the rod and the bonding sections were principally corundum. The rods had a coefficient of thermal expansion of $7.3 \times 10^{-6}$. The coefficient of thermal expansion of the bonding section was $7.0 \times 10^{-6}$.

In carrying out the process, the opposing faces of the bonding section and the rods were carefully ground to eliminate unevenness. The bonding section was then interposed between the two rods and the assembly was fired at cone 14 for 120 minutes with the axes of the rods vertical. The assembly was allowed to cool slowly, i.e. at a rate between 5° and 60° C./hr. The final product was a rod 5 9/16″ long, whose axis showed substantially no deviation from a straight line.

The modulus of rupture of the composite article at the bond was 20,170 p.s.i. compared to 36,000 p.s.i. for the rods before bonding. An identical sample fired at cone 17 had a modulus of rupture of 23,300 p.s.i.

EXAMPLES II TO IV

The procedure of Example I was repeated using different bonding sections. In each case a product was obtained remarkable for its trueness. The compositions and bond strengths are given in Table A below.

*Table A*

| Bonding section composition (wt. percent) | Example II | Example III | Example IV |
|---|---|---|---|
| $Al_2O_3$ | 85.00 | 80.00 | 75.00 |
| $SiO_2$ | 5.00 | 6.50 | 8.50 |
| MnO | 10.00 | 13.50 | 16.50 |
| | 100.00 | 100.00 | 100.00 |
| Modulus of rupture (p.s.i.) of the bond when fired at: | | | |
| Cone 14 | 21,530 | 21,170 | 19,650 |
| Cone 17 | 22,000 | 19,300 | 18,480 |

EXAMPLES V AND VI

In Examples I to IV, the bonding sections, though different from the basic sections, were taken from the system $Al_2O_3$-$SiO_2$-MnO. Examples V and VI illustrate the use of bonding sections taken from different systems. In each of these examples two rods each 2½″ by 5/8″ diameter fired at 1463° C. and having the following fired composition (percent by weight):

| | |
|---|---|
| $Al_2O_3$ | 93.92 |
| $SiO_2$ | 2.75 |
| MnO | 2.83 |
| MgO | 0.50 |
| | 100.00 | were used as the basic sections. In each example the bonding section was a disc 1/8″ long and 5/8″ in diameter. In each example the disc was interposed between the two basic sections, loaded to 3 p.s.i. and fired in vertical position. Further particulars are given in Table B.

Table B

| | Example | |
|---|---|---|
| | V | VI |
| Bonding disc composition (wt. percent): | | |
| $Al_2O_3$ | 86.73 | 8.5 |
| $SiO_2$ | 8.51 | 62.5 |
| CaO | 2.91 | 0.0 |
| MgO | 1.85 | 26.4 |
| BaO | 0.00 | 2.6 |
| | 100.00 | 100.0 |
| Firing temperature (disc), °C | 1,463 | 1,293 |
| Linear coefficient of thermal expansion of disc (1/°C) | $7.42 \times 10^{-6}$ | $7.28 \times 10^{-6}$ |
| Linear coefficient of thermal expansion of disc −coefficient of thermal expansion of rod (difference) (1/°C) | $+0.13 \times 10^{-6}$ | $-0.01 \times 10^{-6}$ |
| Firing temperature of the assembly (°C) | 1,463 | 1,293 |
| Apparent depth of penetration of components from disc into rod, inches | 1/16 | 1/32 |
| Modulus of rupture of joint (p.s.i.) | 19,340 | 4,715 |
| Position of break | (1) | (2) |

1 Center of disc.
2 Between disc and bond.

The apparent depth of penetration of components from the disc into the rod is a measure of the miscibility of the two glass phases and of the bond strength between the bonding section and the basic section.

EXAMPLES VII–XI

Examples VII to XI were conducted to show the effect of reducing the size of the bonding section. In carrying out these examples two ½" rods 2¾" long of the same composition (94.5 $Al_2O_3$-2.8 $SiO_2$-2.7 MnO) used in Examples I to IV were formed using bonding sections having the following composition (weight percent):

| | |
|---|---|
| $Al_2O_3$ | 85.00 |
| $SiO_2$ | 5.00 |
| MnO | 10.00 |
| | 100.00 |

Firing was conducted at 1465° C. for 120 minutes. The bodies were cooled slowly, i.e. at a rate between 5° and 60° C./hr., and then tested for bond strength. The results are tabulated in Table C.

Table C

| Example | Bonding section thickness (inch) | Modulus of rupture (p.s.i.) |
|---|---|---|
| VII | 0.500 | 20,030 |
| VIII | 0.125 | 22,430 |
| IX | 0.062 | 22,200 |
| X | 0.031 | 21,530 |
| XI | 0.015 | 25,570 |

I claim:

1. A method for making a ceramic body which comprises forming an assembly comprising at least two basic integral, fired, ceramic sections and an intermediate integral, fired, ceramic bonding section, each of said basic and bonding sections having a glass phase and a crystalline phase, said bonding section being at least an order of magnitude thinner than the basic sections, having a glass phase miscible with the glass phase of the basic sections and having a maturing temperature below the maturing temperature of the basic sections and firing said assembly at a temperature sufficient to cause coalescence of said basic and bonding sections but insufficient to cause substantial deformation of the basic sections, and for a time sufficient for crystalline growth between said basic and bonding sections to occur.

2. The method claimed in claim 1 wherein the firing is conducted at a temperature at least equal to the maturing temperature of the bonding sections and below the maturing temperature of the basic sections.

3. A method of joining two integral, fired, ceramic bodies, each having a glass phase and a crystalline phase, which comprises interposing between said bodies a thin, fired ceramic bonding sheet, said sheet comprising a crystalline phase and a glass phase which is miscible with the glass phases of said ceramic bodies, and having a lower maturing temperature than either of said bodies; and firing the assembly at a temperature sufficient to cause coalescence of said sheet with each of said bodies, but insufficient to cause deformation of said bodies, and for a time sufficient for crystalline growth between said sheet and said bodies to occur.

4. A method for making a ceramic body which comprises forming a plurality of integral, fired, ceramic basic sections and at least one integral, fired, ceramic bonding section, each of said basic and bonding sections having a glass phase and a crystalline phase, said sections when assembled with a bonding section interposed between each basic section and adjacent basic sections, being of such size and configuration as to compose the desired body, said bonding section having physical properties similar to those of the basic sections, having a thickness which is an order of magnitude less than the thickness of the basic sections, having a glass phase miscible with the glass phase of the basic sections and having a lower maturing temperature than the basic sections, assembling the basic and interposed bonding sections, and firing the assembly at a temperature which is at least equal to the maturing temperature of the bonding section and is not high enough to cause substantial deformation of the basic sections, and for a time sufficient for crystalline growth between said basic and bonding sections to occur.

5. The method claimed in claim 4 wherein the assembly is fired at a temperature below the maturing temperature of the basic sections.

6. A composite ceramic body comprising a plurality of integral, fired basic ceramic sections, and interposed between said basic sections, an integral, fired, ceramic bonding section, each of said basic and bonding sections having a glass phase and a crystalline phase, said bonding section being characterized in that it has a lower maturing temperature than said basic sections and is an order of magnitude thinner than the basic sections; there being a continuous glass phase and an intercrystalline structure connecting said basic and bonding sections.

7. A composite ceramic body comprising a plurality of integral, fired basic ceramic sections of a size sufficiently small to avoid deformation on firing, connected by integral, fired, ceramic bonding sections, each of said basic and bonding sections having a glass phase and a crystalline phase said bonding sections being an order of magnitude smaller than said basic sections, having a lower maturing temperature than said basic sections and comprising a glass phase miscible with the glass phase of said basic sections, there being an intercrystalline structure connecting said basic and bonding sections.

8. A method for bonding integral, fired, ceramic bodies having a glass phase and a crystalline phase and consisting essentially of $Al_2O_3$, $SiO_2$ and MnO and having more than 50% by weight $Al_2O_3$, which comprises interposing between said bodies an integral, fired bonding section having a glass phase and a crystalline phase and consisting essentially of $Al_2O_3$, $SiO_2$ and MnO, the proportion of $Al_2O_3$ in said bonding section being less than the proportion of $Al_2O_3$ in the bodies and the thickness of said bonding section being an order of magnitude less than the thickness of said bodies and firing the assembly at a temperature sufficient to cause coalescence of said bonding section with said bodies but insufficient to cause deformation of said bodies, and for a time sufficient for crystalline growth between said bodies and said bonding section to occur.

9. The method claimed in claim 8 wherein the assembly is fired at a temperature at least equal to the maturing temperature of the bonding section but below the maturing temperature of the bodies.

10. A composite ceramic body comprising a plurality of integral, fired, ceramic basic sections consisting essentially of $Al_2O_3$, $SiO_2$ and MnO, and having at least 50% by weight $Al_2O_3$, and interposed between each of said basic sections, an integral, fired ceramic bonding section, an order of magnitude thinner than said basic sections, consisting essentially of $Al_2O_3$, $SiO_2$ and MnO and having a lesser proportion of $Al_2O_3$ than said basic sections, each of said basic and bonding sections having a glass phase and a crystalline phase, and, there being a continuous glass phase and an intercrystalline structure between said bonding section and each of said basic sections.

References Cited by the Examiner

UNITED STATES PATENTS

| | | | |
|---|---|---|---|
| 1,927,894 | 9/33 | Krause | 156—89 X |
| 2,290,107 | 7/42 | Luks | 106—46 |
| 2,494,699 | 1/50 | Forrester et al. | 156—89 |
| 2,517,019 | 8/50 | Nordberg | 65—47 X |
| 2,568,881 | 9/51 | Albers-Schoenberg | 154—128 |
| 2,642,633 | 6/53 | Dalton | 65—43 |
| 2,643,020 | 6/53 | Dalton | 65—58 X |
| 2,731,579 | 1/56 | Weiss. | |
| 2,889,952 | 6/59 | Claypoole | 65—33 X |
| 2,894,294 | 7/59 | Prescott | 65—43 X |
| 3,063,198 | 11/62 | Babcock | 65—33 X |

DONALL H. SYLVESTER, *Primary Examiner.*

CARL F. KRAFFT, ARTHUR P. KENT, WILLIAM B. KNIGHT, *Examiners.*